3,042,721
DI-LOWER ALKYL-AMINOPHENYL-LOWER
ALKYLENE HYDRAZINES
Thomas Samuel Gardner, Rutherford, John Lee, Essex
Fells, Jacob Finkelstein, West Englewood, and Edward
Wenis, Leonia, N.J., assignors to Hoffmann-La Roche
Inc., Roche Park, Nutley, N.J., a corporation of New
Jersey
No Drawing. Filed May 12, 1959, Ser. No. 812,603
6 Claims. (Cl. 260—569)

This invention relates to di-lower alkyl-aminophenyl-lower alkylene hydrazines and to acid addition salts thereof. The lower alkyl groups in the compounds of this invention include straight chain and branched chain saturated hydrocarbon groups such as methyl, ethyl, propyl, isopropyl, butyl, isobutyl, amyl, isoamyl and the like. The lower alkylene group refers to similar straight chain and branched chain saturated hydrocarbon radicals having bonds available at each chain end for attachment to the nitrogen atom and to the phenyl group, respectively. The di-lower alkyl-amino group may be attached to either the ortho, meta or para position of the phenyl ring. A preferred subgroup of compounds is di-lower alkyl-aminobenzyl hydrazines, particularly 4-di-lower alkyl-aminobenzyl hydrazines.

The products of this invention form acid addition salts by reaction with various inorganic and organic acids. Both mono and poly acid addition salts are formed. Illustrative of the acid addition salts which are formed by the hydrazines of this invention are the hydrohalides, e.g. hydrochloride, hydrobromide, hydroiodide, etc., other mineral acid salts, e.g. sulfate, phosphate, nitrate, etc., alkyl and aralkyl sulfonates, e.g. ethanesulfonate, benbenesulfonate, p-toluenesulfonate, etc., and other acid salts such as tartrate, citrate, ascorbate, malate, mandelate, malonate, adipate, succinate, fumarate, pimelate, stearate, maleate, etc. The hydrohalides, and in particular the hydrochloride, are preferred. The acid addition salts are prepared by reacting the base with the appropriate inorganic or organic acid, preferably with an excess of the acid and in an inert solvent, and recovering the product by conventional means from the reaction mixture, e.g. by evaporation of the solvent or by filtration. The acid salt may be converted to the base by neutralization, e.g. with sodium hydroxide.

The di-lower alkyl-amino phenyl-lower alkylene hydrazines of this invention may be produced by reacting an aldehyde containing the appropriate di-lower alkyl-aminophenyl group with hydrazine hydrate and reducing the di-lower alkyl-aminophenyl-lower alkylidene hydrazine thus obtained, for example, with hydrogen in the presence of palladium-carbon catalyst. It is convenient to carry out the condensation with hydrazine hydrate and the reduction simultaneously by admixing the aldehyde with hydrazine hydrate and catalyst in an inert solvent such as an aliphatic alcohol in a hydrogen atmosphere at elevated pressure. The end product may be separated from the reaction mixture by conventional procedures such as filtering off the catalyst from the solvent, distilling to concentrate the product of crystallizing. A ketone, e.g. 1 - (p-dimethylaminophenyl) - 2 - propanone, may also be used as one of the reactants. In this case it is preferable to react the ketone with an acyl hydrazine, e.g. acetylhydrazine, reduce the hydrazone obtained and then remove the acetyl group by hydrolysis, e.g. with aqueous mineral acid.

The compounds of this invention are monoamine oxidase inhibitors, that is, they inhibit the activity of monoamine oxidase in the brain which effects the deactivation of physiological regulators such as serotonin, tryptamine, epinephrine and the like, and stimulate the central nervous system. The duration of effect varies with individual compounds, some having a long acting effect and others having a short acting effect, thereby providing a broad spectrum to meet specific needs. They are particularly useful for relief of disturbed states in psychotherapy. The bases, or medicinally acceptable acid addition salts thereof, may be administered orally or parenterally in conventional solid or liquid dosage forms such as tablets, capsules, injectables, etc., comprising therapeutic dosages incorporated in conventional solid or liquid vehicles, either with or without excipients.

The following examples are illustrative of the invention. All temperatures are stated in degrees Centigrade.

*Example 1*

300 g. of 4-dimethylaminobenzaldehyde were added to a solution of 240 g. of 85% hydrazine hydrate in 2.4 kg. of isopropanol in a shaking-type autoclave. To the solution were added 25 g. of 10% palladium-on-charcoal as catalyst. Hydrogen was introduced and the pressure adjusted to 500 p.s.i. The temperature spontaneously rose to about 30 to 40°. When the calculated equivalent proportion of hydrogen was absorbed, the material was removed from the autoclave and filtered. The filtrate was concentrated under vacuum and the residue was distilled at 140–143°/2–3 mm. The light yellow distillate, 4-dimethylaminobenzylhydrazine, $N_D^{25}=1.5888$, crystallized at a temperature below 10°. The crystalline product melts at about 10°.

30 g. of liquid 4-dimethylaminobenzylhydrazine were added to 500 ml. of ethanol containing 35 ml. of 4 N HCl in ethanol. On chilling to about −5°, a colorless product separated. The product, 4-dimethylaminobenzylhydrazine monohydrochloride, was filtered off and washed by sludging with cold ethanol, M.P. 149–151°. The dihydrochloride formed by reaction with an excess of ethanolic hydrogen chloride melts at 165–168°.

The following acid salts of 4-dimethylaminobenzylhydrazine, crystalline substances except where otherwise indicated, were prepared by the procedure described above: sulfate, amorphous; phosphate, M.P. 164–166°; p-toluenesulfonate, M.P. 169–170°; tartrate, M.P. 125°; citrate, amorphous; DL-malate, M.P. 138–140°; DL-mandelate, M.P. 148–149°; malonate, M.P. 136–138°; adipate, M.P. 103–104°; succinate, M.P. 139–141°; fumarate, M.P. 159–160°; stearate, M.P. 159–160°; maleate, M.P. 140–142°.

*Example 2*

354 g. of 4-diethylaminobenzaldehyde and 240 g. of 85% hydrazine hydrate were added to 3 liters of isopropanol. To the solution were added 25 g. of 10% palladium-carbon catalyst and reduction at a pressure of 500 p.s.i. of hydrogen at 25° was carried out as described in Example 1. The product, 4-diethylaminobenzylhydrazine, was isolated by filtration and vacuum distillation in a Vigreaux column at 163–165°/3 mm. as described in Example 1. Redistillation gave a sharp fraction at 163–164°/2 mm., $N_D^{25}=1.5710$.

*Example 3*

59 g. of 3-dimethylaminobenzaldehyde and 49.5 g. of 85% hydrazine hydrate were dissolved in 600 ml. of isopropanol. To the solution were added 5 g. of 10% palladium-carbon catalyst. The solution was reduced under a pressure of 500 p.s.i. at 25° according to the procedure described in Example 1. The product, 3-dimethylaminobenzylhydrazine, was isolated by filtration and fractionation in a Vigreaux column at 138–148°/2 mm. as described in Example 1. The product was refractionated twice more at 138–140°/2 mm., $n_D^{25}=1.5850$.

Example 4

In a 1-liter, 3-neck flask equipped with stirrer, dropping funnel, condenser and drying tube, were placed 6.8 g. of magnesium turnings, 5 ml. of absolute ethanol, and 0.5 ml. of carbon tetrachloride. The reaction began at once, whereupon 75 ml. of dry ether was added followed by a solution of 44.2 g. of diethyl malonate in 25 ml. of absolute ethanol at such a rate so as to maintain gentle refluxing. When the addition was completed, the reaction mixture was refluxed on a steam bath until all the magnesium had reacted. It was then cooled and stirred while a solution of 50.6 g. of p-nitrophenylacetyl chloride and 350 ml. of dry ether was added over a period of ½ hour. The mixture was then refluxed for 2 hours to complete the reaction. The reaction mixture was decomposed by the addition of 5% sulfuric acid while cooling externally. An ether layer separated. The ether layer was removed and the aqueous layer further extracted two times with fresh ether. After washing the combined ether extracts with water, drying and concentrating in vacuo, crude diethyl p-nitrophenacyl malonate was obtained as a residue.

The crude diethyl p-nitrophenacyl malonate in 70 ml. of acetic acid, 40 ml. of water and 8.6 ml. of concentrated sulfuric acid was refluxed for approximately 5 hours until all the carbon dioxide had been evolved. The hydrolyzed solution was cooled and poured into 500 ml. of cold water. The resultant oil crystallized when set in ice. The precipitate was filtered and washed with water and 5% sodium bicarbonate to remove the acid. The 1-(p-nitrophenyl)-2-propanone was air dried, M.P. 59–61°.

The solution of 39.5 g. of 1-(p-nitrophenyl)-2-propanone and 57 ml. of formalin in 1 liter of ethanol was hydrogenated at room temperature under 200 p.s.i. of hydrogen pressure in the presence of Raney nickel for 2 hours. After filtering off the catalyst, the filtrate was concentrated in vacuo. The residual liquid was fractionated and the fraction boiling at 120–125°/2–3 mm., comprising 1-(p-dimethylaminophenyl)-2-propanone as a yellow liquid, was collected.

A solution of 4.8 g. of 1-(p-dimethylaminophenyl)-2-propanone and 2.4 g. of acetyl hydrazine in 50 ml. of dry benzene was refluxed for 3 hours with a water separator. The benzene solution was concentrated in vacuo. The residual yellow solid, 1-($\alpha$-methyl-4-dimethylaminophenethylidene)-2-acetylhydrazine, was recrystallized from methanol, M.P. 152–154°.

2.7 g. of 1-($\alpha$-methyl-4-dimethylaminopheneethylidene)-2-acetylhydrazine were dissolved in 40 ml. of acetic acid and reduced under a pressure of 50 p.s.i. of hydrogen in the presence of 50 mg. of platinum oxide catalyst. When one equivalent proportion of hydrogen was absorbed, the reaction was stopped, the catalyst was filtered off and the filtrate was concentrated in vacuo. The residual syrup was dissolved in water and the solution was made alkaline with dilute sodium hydroxide solution. The solution was repeatedly extracted with ether. After the ether extracts were combined, dried and evaporated in vacuo, a yellow syrup was obtained which crystallized upon scratching. The product, 1-($\alpha$-methyl-4-dimethylaminophenethyl)-2-acetylhydrazine, was recrystallized from cyclohexane, M.P. 82–84°.

0.72 g. of 1-($\alpha$-methyl-4-dimethylaminophenethyl)-2-acetylhydrazine were dissolved in 10 ml. of 3 N HCl and refluxed for 3 hours. The reaction mixture was concentrated to dryness in vacuo. The concentration was repeated twice after the addition of 10 ml. of water each time and then once after the addition of 15 ml. of ethanol. The residue was dissolved in a small amount of hot ethanol, filtered and kept at room temperature to crystallize. The product, $\alpha$-methyl-4-dimethylaminophenethylhydrazine dihydrochloride, was recrystallized from ethanol, M.P. 179–180°.

We claim:
1. A compound selected from the group consisting of di-lower alkyl-aminophenyl-lower alkylene hydrazine and acid addition salts thereof with medicinally acceptable acids.
2. Di-lower alkyl-aminobenzylhydrazine.
3. 4-dimethylaminobenzylhydrazine.
4. 4-diethylaminobenzylhydrazine.
5. 3-dimethylaminobenzylhydrazine.
6. $\alpha$-Methyl-4-dimethylaminophenethylhydrazine.

References Cited in the file of this patent

UNITED STATES PATENTS 2,978,461    Biel _____ Apr. 4, 1961

FOREIGN PATENTS 737,271    Great Britain _____ Sept. 21, 1955